United States Patent [19]

McSherry et al.

[11] Patent Number: 4,650,386

[45] Date of Patent: Mar. 17, 1987

[54] FULLY ARTICULABLE POSITIONING DEVICE

[75] Inventors: Thomas W. McSherry, Stamford, Conn.; Nathaniel H. Garfield, Harrison, N.Y.

[73] Assignee: Mechanical Plastics Corp., Pleasantville, N.Y.

[21] Appl. No.: 694,543

[22] Filed: Jan. 24, 1985

[51] Int. Cl.$^4$ .................. F16B 21/06; F16B 13/04
[52] U.S. Cl. .................................. 411/340; 411/344; 411/345; 411/346
[58] Field of Search .................. 411/340, 341, 342–346

[56] References Cited

U.S. PATENT DOCUMENTS

| | | | |
|---|---|---|---|
| 1,521,025 | 12/1924 | Hubener | 411/344 |
| 3,332,118 | 7/1967 | Temple | 411/340 |
| 3,604,304 | 9/1971 | Botting | 411/343 |
| 4,043,245 | 8/1977 | Kaplan | 411/346 |
| 4,075,924 | 2/1978 | McSherry et al. | 411/366 |
| 4,120,231 | 10/1978 | Neumayer | 411/340 |
| 4,125,048 | 11/1978 | Hardin | 411/344 |
| 4,286,497 | 9/1981 | Shamah | 411/345 |
| 4,294,156 | 10/1981 | McSherry et al. | 411/344 |
| 4,439,079 | 3/1984 | Losada | 411/340 |

FOREIGN PATENT DOCUMENTS 182293  4/1922  United Kingdom ............... 411/340

*Primary Examiner*—Gary L. Smith
*Assistant Examiner*—Suzanne L. Dino
*Attorney, Agent, or Firm*—Pennie & Edmonds

[57] ABSTRACT

A fully articulable positioning device for positioning an elongated member comprising a pair of legs hingeably attached to the elongated member at one end of the legs and a slideable connection at the opposite end of the legs. The slideable connection is of the pin and slot variety wherein each leg contains a pin and slot for communication with the slot and pin of the other leg. The leg may be of any length suitable for their intended use and may be improved by the addition of handle-like projections at the slideably connected end.

9 Claims, 4 Drawing Figures

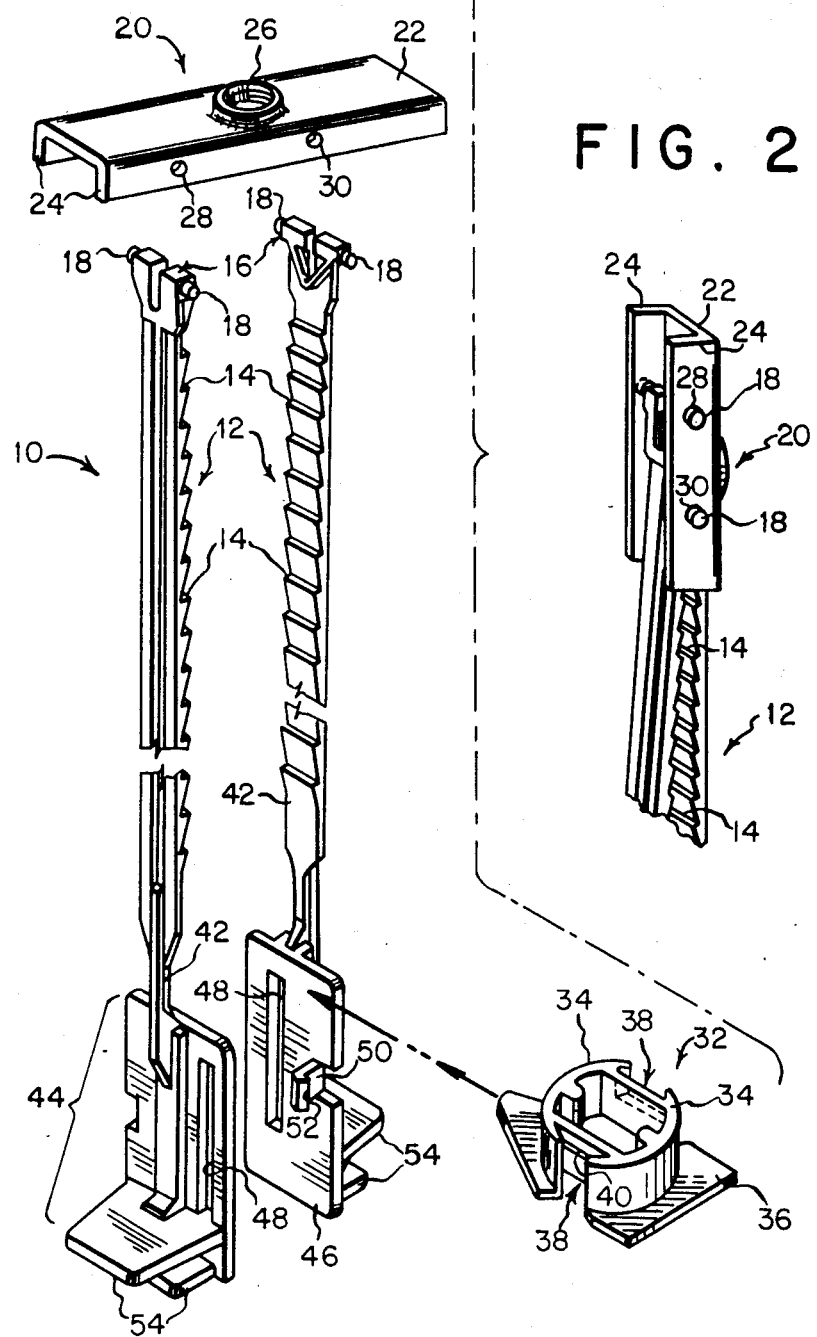

FULLY ARTICULABLE POSITIONING DEVICE

BACKGROUND ART

The present invention relates to a positioning device for positioning an elongated member in an inaccessible space. In particular, the present invention relates to an improved anchor assembly of the type generally described in U.S. Pat. No. 4,075,924 issued to Thomas McSherry et al. on Feb. 28, 1978 and improvements described in U.S. Pat. No. 4,294,156 issued to Thomas McSherry et al. on Oct. 13, 1981. The '924 patent describes an anchor assembly comprising a pair of elongated leg members of flexible material and an elongated anchor member coupled to adjacent end portions of the legs. In the '924 patent the leg members may include resilient means such as traversely bent end portions to resiliently bias the anchor member generally traversely to the legs. In the '156 patent the anchor is hingeably attached to the legs such that the legs can rotate in a plane defined by their longitudinal axis. The hinge effect is accomplished by use of transverse studs at the ends of the legs which engage paired apertures in longitudinal flanges of the anchor member.

In use, both assemblies have their flexible legs bent such that the long dimension of the anchor member is oriented generally parallel to such legs, thereby enabling insertion of the assembly into a hole cut or drilled in a wall or ceiling. In the '924 assembly, the transversely bent end portions of the legs bias the anchor back into its transverse position once it is inserted through the wall far enough to clear the restriction of the hole to this movement. In the '156 assembly the anchor is biased to the transverse position by the resiliency of the legs. In both patents, when the anchor is in the proper orientation for insertion, one leg of the assembly is bowed out away from the other. This bowing is caused by the shorter distance from one aperture to the opposite connection of the leg ends than the distance from the aperture of the straight leg's connection to the opposite connection of the leg ends. After full insertion this bowing creates the spring force that is necessary to bias the anchor member to its transverse position.

Another form of anchor assembly is described in U.S. Pat. No. 4,043,245 issued to Stanley Kaplan on Aug. 23, 1977. In the Kaplan assembly the legs are spaced apart across the narrow dimension of the anchor member and each leg is attached to only one side of the anchor member channel, via a trunnion inserted into an apertured flange.

The '924, '156 and '245 configurations of anchor assemblies have characteristics that can greatly limit the maximum strength of the leg portions and the size of the device as a whole. The legs in the '245 patent are connected with trunnions to the anchor member for relative pivotal movement, but the more secure this connection, the greater potential there is for frictional interference with such pivotal movement. The presence of a resilient biasing means in the '924 patent tends to limit the maximum strength available in the legs of the device. In both '924 and the '156 patents, the presence of the bowed leg during insertion into an opening interferes with the insertion of the anchor assembly and its proper placement.

DISCLOSURE OF THE INVENTION

An improved anchor assembly is provided for retaining an elongated fastener member within an opening defined by a wall portion having at least one concealed side. Such devices typically comprise at least two elongated leg members, means for connecting a pair of adjacent end portions of the leg members, an apertured anchor member coupled to the legs at opposite end portions and a collar member secured to the legs for sandwiching the wall portion between the collar and the anchor member. The improvement comprises providing means for slidable connection of the adjacent end portions of the leg members such that the end portions slide relative to each other substantially in the direction of the legs' long dimension to remove the bowing of one leg when the anchor member is placed in a position for insertion.

Because of the articulation provided by the end connection of the present invention, the anchor is placed in its orientation parallel to the elongated dimension of the legs without bowing one leg. Because neither leg is bowed, the anchor device may be inserted into openings with deeper dimensions without any leg-bow interference. This feature allows the anchor to be used in connection with a guide tube. When it is necessary to penetrate two or more surfaces with open space between them, an elongated tube may be inserted through the openings first. Then, the anchor is inserted through the tube and consequently through the openings. Prior art anchors could not make this type of connection, either with or without the guide tube. If a guide tube was used, the leg bow would interfere with the proper insertion of the device. If no tube is used, the prior art devices would spring to their open position upon reaching the open space behind the first surface. This would prevent insertion of the anchor through the second surface.

BRIEF DESCRIPTION OF THE DRAWINGS

FIG. 1 is an exploded perspective view of one embodiment of the invention.

FIG. 2 is an enlarged perspective view showing the anchor member in its insertion-removal orientation.

BEST MODE FOR CARRYING OUT THE INVENTION

Figure 3:
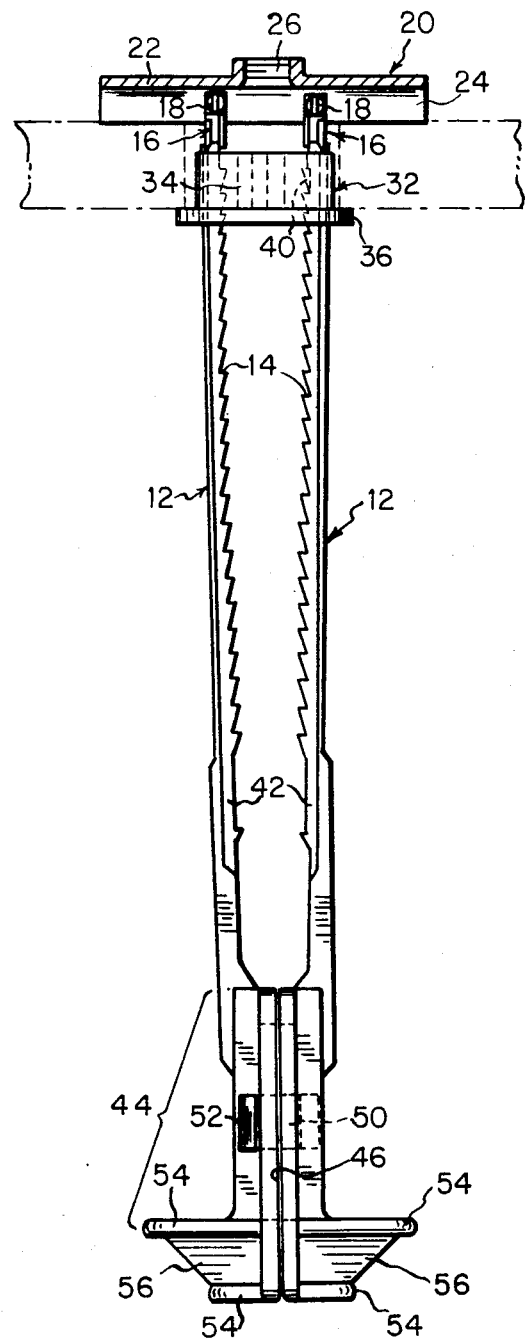
FIG. 3 is a side elevation of the embodiment shown in FIG. 1.

Referring to the drawings, FIG. 1 illustrates a preferred anchor assembly in accordance with the invention with its component parts shown separately for purposes of description. The anchor assembly 10 comprises a pair of elongated substantially straight legs 12. The legs 12 are preferably constructed of a resilient material such as plastic or metal which is relatively rigid although it can be elastic for lower strength devices or more rigid for higher strength devices. The legs 12 have opposing serrated surfaces comprised of a plurality of adjacent teeth 14.

The upper end portions 16 of each of the legs 12 terminates in a coupling stud 18 extending parallel with the major transverse surface of each respective leg. These studs permit coupling of the legs to channel member 20. It should be appreciated that although a coupling stud and aperture arrangement is used in this embodiment, any hingeable or flexible connection which allows the proper rotational motion of the legs could be used.

Channel member 20 is preferably constructed of metal, such as steel plate, and has a channel like cross sectional configuration with a central plate section 22 and flanges or end plates 24 extending downwardly therefrom.

The central plate section 22 preferably defines an opening 26, such as a threaded opening, for receiving elongated fastening members such as bolts or screws. Said opening may be slightly larger than the width of the elongated fastener to be used and the desired threaded opening obtained by rigidly fixing another member defining a threaded opening of desired size, such as a nut, to the upper side of the central plate section such that the two openings are coaxial.

Flanges 24, in the preferred assembly, are each provided with a pair of coupling apertures 28 and 30 for receiving the coupling studs 18 of each leg 12.

In the preferred embodiment illustrated in the drawings, the coupling apertures are positioned near the threaded opening 26 in the anchor. As will become apparent below, this location of the coupling assists in the threading of the elongated fastener member by guiding the elongated member to the opening. Because the end connection which is the subject of this invention allows full articulation of the legs, the leg attachments need not be spread as far apart as was necessary in prior art devices. The spread was necessary in the prior art to provide a sufficient moment arm for the biasing force provided by the legs.

The collar 32 is comprised of a generally planar base 36 having flanges 34 extending upward therefrom. These flanges 34 and the base 36 are constructed integrally and are preferably of resilient material such as plastic, to facilitate the racheting action necessary during anchor installation.

The upstanding flanges 34 define slots 38 within which are provided teeth members 40 which are oppositely positioned to the tooth-like protuberances 14 of the legs 12. The slots 38 communicate with tapered leg portions 42 which conveniently guide the leg members 12 toward the slots 38 for the purpose of completing the assembly of the collar 32 and the legs 12.

Figure 4:
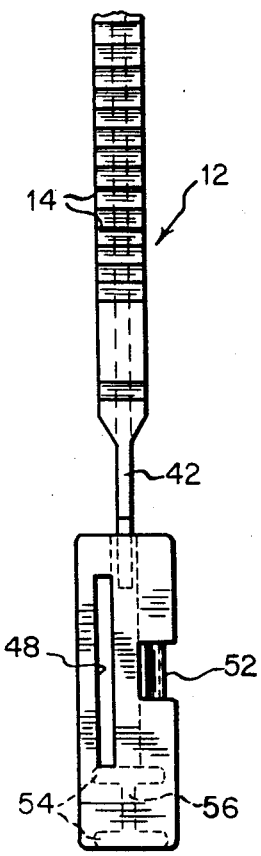
FIG. 4 is a side view of the slideable connection of the invention.

The lower end portions 44 of each leg have the improved connection that is the subject of this invention. The opposed inner surfaces 46 of the handle ends 44 of the legs have a substantially smooth planar surface 46 defining a slot like opening 48, FIG. 4, with its elongated dimension running in the same direction as the elongated dimension of the legs 12.

At a distance perpendicular to said slot 48 there is protuberance 50 of substantially rectangular cross sectional shape. The narrow transverse dimension of the protuberance runs in a direction perpendicular to the long dimension slot 48 and is slightly less than the dimension of the slot running in the same direction. The protuberance 50 has a wedge shaped top with its peak being the terminal part of the protuberance above and substantially parallel to the substantially planar surface 46. The ridge line of the wedge shape runs substantially parallel to the slot-like opening. The angle of the wedge top is such that the dimension across the base of the wedge top is slightly larger than the transverse dimension of the base portion of the protuberance 50. This creates a recess of rectangular shape defined by the planar base 46, the surface running between the base portion of the protuberance 50 and the lower edge 52 of the wedge shaped top portion. The transverse dimension of the protuberance 50 measured at the widest portion of the wedge shaped top is slightly greater than the narrow dimension of the slot 48 measured parallel to the plane of the substantially planar opposing surfaces 46. The dimension of the protuberance 50, measured perpendicularly to said planar surface, from said planar surface to the lower edge 52 of the wedge shaped top portion is slightly greater than the depth of the slot, measured in the direction perpendicular to the substantially planar surface. The protuberance 50 is located at a point on a line perpendicular to substantially the mid point of the elongated dimension of the slot 48. The protuberance 50 and slot 48 are separated by a dimension which is bisected by the center line of the planar surface running parallel to the axis of the legs 12 such that each one is equidistant from such center line.

To assist in the articulation of the anchor member, each adjacent end has a handle-like portion. In the preferred embodiments these take the form of two planar portions 54, best seen in FIGS. 1 and 3, on each leg connected by a transverse planar portion 56. When the anchor is assembled the planar portions of each leg run in a direction away from the opposing leg such that they protrude out to form a split T-shape at the adjacent end.

In the form of the preferred embodiment, the anchor assembly is easily fabricated. Anchor member 20 is formed of steel channel with the aperture holes punched through it.

The legs are injection molded of polystyrene in the preferred embodiment although other materials may be used. Because of the unique configuration of the adjacent ends the two legs are the same when molded. The legs are positioned so the long dimension of each leg is parallel to the long dimension of the other leg such that the planar surfaces oppose each other and the toothed surfaces face each other. Because the adjacent end slot and pin arrangement is positioned as discussed above, the pin of one leg will snap into the slot of the second leg and the remaining pin and slot will line up and snap together at the same time. The coupling studs may be snapped into the coupling apertures either before or after the adjacent ends are snapped together.

Preferably, the collar 32 is then snapped onto the legs to complete the assembly. This is done by placing the tapered leg portions 42 partially in the slots 38 of the collar 32 while the collar is at an angle to the elongated dimension of the legs and twisting the collar into place so as not to flex the legs. Flexing the legs could cause them to fracture. Then the collar is slid up onto the widened portions of the legs leading to the teeth 14.

Once the anchor has been assembled the adjacent ends may be displaced relative to each other and this controls the orientation of the anchor member. Because of this feature the anchor member may be more easily placed against the concealed side of the wall portion in proper position. At the same time, one of the unique features of this invention is that after the adjacent ends have been used to place the anchor member in its transverse orientation, the anchor member may also be removed by displacing the handles relative to each other to move the anchor into an orientation such that its long dimension runs substantially parallel to the long dimension of the legs. The assembly may then be pulled from the hole.

After the anchor member is inserted into the hole and properly positioned on the concealed side of the wall by manipulation of the handles, the collar 32 is slid on the legs toward the anchor member to become locked in place flat against the exterior wall surface by means of the tooth-like protuberances. The sections of the legs projecting out of the collar away from the wall surface (FIG. 3) are then broken off. This leaves the anchor member locked in place with the wall sandwiched between its collar and anchor member through the connections provided by the remaining portions of the legs.

As can easily be seen, the legs may be provided with any length necessary for a particular application of the device, therefore the length of the legs is shown indefinitely in the FIG. 1. A longer length, for example, is used in roofing systems in connection with a stainless steel channel member 20 for strength and no rusting in the inaccessible places often encountered in such uses.

It is also preferred in anchors using long leg members that the toothed portions of the legs 12 not extend all the way to the end portions 16. This provides greater strength by eliminating stress points in that area and also eliminates interference with bolt that teeth in in that area may cause.

Although the above discussion has been of preferred embodiments of the invention, it is to be understood that this is merely illustrative of the many other embodiments that can utilize the invention. Thus many varied devices can be made by those skilled in the art without departing from the scope and spirit of the present invention.

We claim:

1. In an anchor assembly for retaining an elongated fastener member within an opening defined by a wall portion having at least one concealed side, said anchor assembly being of the type comprising (1) at least two elongated leg members each having a long dimension and a major transverse dimension, (2) a means for connecting a pair of adjacent end portions of said leg members, (3) an apertured anchor member coupled to said legs at the opposite end portions thereof, (4) a collar member secured to said legs for sandwiching said wall portion between said collar and said anchor member, the improvement wherein:
said means for connecting a pair of adjacent end portions of said leg members is such that the leg ends are slidably connected to permit slidable movement thereof relative to each other, in a direction substantially parallel to the elongated dimension of the legs and wherein said means for slidably connecting said adjacent ends is such that said adjacent ends may be displaced, by said slidable movement, to an extent sufficient so as to thereby put said anchor member in orientation for removal from or emplacement within said opening without bowing of either of said leg members.

2. In an improved anchor assembly according to claim 1 further comprising tooth-like protuberances on said elongated leg members which mate with at least one protuberance on said collar to provide uni-directional motion of said collar relative said elongated leg members the improvement wherein:
said tooth-like protuberances do not extend all the way to said opposite end portions of said elongated leg members.

3. An improved anchor assembly according to claim 1 characterized in that:
said adjacent ends are such that each has protruding substantially perpendicularly from it, a handle-like protuberance to facilitate gripping and articulation of the anchor assembly.

4. In an anchor assembly for retaining an elongated fastener member within an opening defined by a wall portion having at least one concealed side, of the type comprising (1) at least two elongated leg members each having a long dimension and a major transverse dimension, (2) a means for connecting a pair of adjacent end portions of said leg members, (3) an apertured anchor member coupled to said legs at the opposite end portions thereof, (4) a collar member secured to said legs for sandwiching said wall portion between said collar and said anchor member, the improvement wherein:
said means for connecting a pair of adjacent end portions of said leg members is such that the leg ends are slidably connected to permit slidable movement thereof relative to each other, in a direction substantially parallel to the elongated dimension of the legs and wherein:
said means for slidably connecting said adjacent ends comprises at least one pin and at least one slot each on opposite legs such that they communicate and allow the legs to slide relative to each other.

5. An improved anchor assembly according to claim 4 wherein:
said means for slidably connecting comprises a pin and a slot on each leg end such that the pin on each leg communicates with the slot of the opposite leg allowing the legs to slide relative to one another.

6. In an anchor assembly for retaining an elongated fastener member within an opening defined by a wall portion having at least one concealed side, said anchor assembly being of the type comprising (1) at least two elongated leg members each having a long dimension and a major transverse dimension, (2) a means for connecting a pair of adjacent end portions of said leg members, (3) an apertured anchor member coupled to said legs at the opposite end portions thereof, (4) a collar member secured to said legs for sandwiching said wall portion between said collar and said anchor member, (5) said anchor member comprises a channel member having a pair of flanges each defining a pair of coupling apertures, and (6) each of said legs comprises an end portion having a pair of coupling studs aligned along said major transverse dimension with each pair of said coupling studs engaging each of said pair of flanges of said anchor member through said coupling apertures, such that each of said legs is thereby pivotable in a common plane about an axis of rotation which is coincident with said major transverse dimension, the improvement wherein:
said means for connecting a pair of adjacent end portions of said leg members is such that the leg ends are slidably connected in that they can slide relative to each other, in a direction substantially parallel to the elongated dimension of the legs and wherein said means for slidably connecting said adjacent ends is such that said adjacent ends may be displaced, by said slidable movement, to an extent sufficient so as to thereby put said anchor member in orientation for removal from or emplacement within said opening without bowing of either of said leg members.

7. An improved anchor assembly according to claim 6 wherein:
substantially at the adjacent end of each leg there are handle-like protuberances protruding perpendicularly from each leg, said protuberances protruding in substantially opposite directions to facilitate gripping and articulation of said leg members.

8. In an anchor assembly for retaining an elongated fastener member within an opening defined by a wall portion having at least one concealed side, of the type comprising (1) at least two elongated leg members each having a long dimension and a major transverse dimension, (2) a means for connecting a pair of adjacent end portions of said leg members, (3) an apertured anchor member coupled to said legs at the opposite end portions thereof, (4) a collar member secured to said legs for sandwiching said wall portion between said collar and said anchor member, (5) said anchor member comprises a channel member having a pair of flanges each defining a pair of coupling apertures and (6) each of said legs comprises a substantially straight portion having disposed at each end thereof a coupling stud aligned along said major transverse dimension with each of said coupling studs engaging each of said pair of flanges of said anchor member through said coupling apertures, such that each of said legs being pivotable in a common plane about an axis of rotation which is coincident with the longitudinal axis of the coupling stud, the improvement wherein:

said means for connecting a pair of adjacent end portions of said leg comprises, a pin and a slot on the adjacent end portion of each leg such that the pin of each leg communicates with the slot of the other leg, said pin and slot arrangements being separated on the face of each leg in a direction perpendicular to the plane of pivotable motion of said legs, said pins being substantially rectangular in cross sectional shape and having a protuberance disposed from the base of the pin such that said pins will snap into communication with their corresponding slots and resist separation of the ends while allowing the ends to move slidably relative to each other in the direction substantially parallel to the long dimension of the legs.

9. An improved anchor assembly according to claim 8 wherein:

substantially at the adjacent end of each leg there is a handle-like protuberance protruding perpendicularly therefrom, said protuberances protruding in substantially opposite directions to facilitate gripping and articulation of said leg members.

* * * * *